US006446259B2

(12) United States Patent
Brett

(10) Patent No.: US 6,446,259 B2
(45) Date of Patent: Sep. 3, 2002

(54) SYSTEM AND METHOD FOR GENERATING AN OBJECT STRUCTURE AT RUN TIME IN AN OBJECT-ORIENTED PROGRAMMING LANGUAGE

(75) Inventor: Bevin R. Brett, Brookline, NH (US)

(73) Assignee: Compaq Computer Corporation, Houston, TX (US)

( * ) Notice: Subject to any disclaimer, the term of this patent is extended or adjusted under 35 U.S.C. 154(b) by 46 days.

(21) Appl. No.: 08/929,920

(22) Filed: Sep. 15, 1997

(51) Int. Cl.[7] .................................................. G06F 9/44
(52) U.S. Cl. ...................................... 717/165; 709/331
(58) Field of Search ........................ 395/705; 709/331; 717/108, 116, 165

(56) References Cited

U.S. PATENT DOCUMENTS

| | | | | |
|---|---|---|---|---|
| 5,297,284 A | | 3/1994 | Jones et al. ................. 395/700 |
| 5,327,562 A | | 7/1994 | Adcock ...................... 395/700 |
| 5,371,891 A | | 12/1994 | Gray et al. ................. 395/700 |
| 5,410,705 A | | 4/1995 | Jones et al. ................. 395/700 |
| 5,432,936 A | | 7/1995 | Gray et al. ................. 395/700 |
| 5,442,793 A | | 8/1995 | Christian et al. ........... 395/700 |
| 5,617,569 A | * | 4/1997 | Gray et al. ................. 395/614 |
| 5,754,862 A | * | 5/1998 | Jones et al. ................. 395/705 |
| 5,781,903 A | * | 7/1998 | Rusterholz .................. 707/100 |
| 5,930,795 A | * | 7/1999 | Chen et al. ................. 707/100 |

\* cited by examiner

Primary Examiner—Zarni Maung
Assistant Examiner—G. Lawrence Opie
(74) Attorney, Agent, or Firm—Cesari and McKenna, LLP

(57) ABSTRACT

A language translator is provided which determines memory structure at compile time for a plurality of object classes including at least one virtual base class and at least one class derived therefrom. At compile time, space for pointers (b-pointers) is set aside in each class object that will have a base table (b-table) associated therewith. The b-pointers point, at run time, to an associated b-table containing memory offsets between the base classes of the derived class. At run time, constructors construct the class objects, starting from the most derived class object and proceeding through to the base class object. However, instead of generating the virtual tables and associated pointers, as well as the adjusting functions, at compile time, the language translator generates the code for these operation to be executed at run time. Then at run time, a virtual function table is generated for the base class. Since the necessary offsets are known at run time, all of the adjusting functions, the virtual function tables, and the virtual pointers may be generated. Thus, the system completes the construction of an object.

9 Claims, 5 Drawing Sheets

SYSTEM AND METHOD FOR GENERATING AN OBJECT STRUCTURE AT RUN TIME IN AN OBJECT-ORIENTED PROGRAMMING LANGUAGE

FIELD OF THE INVENTION

The present invention is directed to object oriented computer programming languages and, in particular, to a compiler which implements virtual inheritance in object oriented programs.

BACKGROUND OF THE INVENTION

Object oriented computer programming (OOP) techniques for facilitating the development of complex computer programs are well-known and widely used. As understood by those skilled in the art, these techniques involve the definition, creation, use and destruction of "objects." These objects are software entities including both data elements and functions which manipulate the data elements. The data and related functions are treated by the software as an entity that can be created, used and deleted as if it were a single item. Together, the data and functions enable objects to model any real world entity in terms of its characteristics, which can be represented by the data elements, and its behavior, which can be represented by its data manipulation functions. In this way, objects can model concrete things, as well as abstract concepts, such as numbers or geometrical designs.

In an OOP programming language, objects are defined by creating "classes," which are not objects themselves, but act as templates that instruct the compiler how to construct actual objects which are "instances" of the classes. For example, a class may specify the number and type of data variables and the steps involved in the functions which manipulate the data. A corresponding object is actually created by a special function called a "constructor". The constructor uses the corresponding class definition and additional information, such as arguments specified during object creation, to create an object. Similarly, objects are destroyed by a special function called a "destructor" when the objects are no longer of use.

The principle benefits of OOP techniques arise out of three basic characteristics: encapsulation; polymorphism; and inheritance. Data encapsulation refers to the binding of data and related functions. More specifically, an object can be designed to "hide" (or "encapsulate"), all or a portion of its internal data structure and corresponding internal functions. For instance, during program design, a program developer can define objects in which all or some of the data variables and all or some of the related functions are considered "private" or for use by only the object itself. Other data or functions can be declared "public" or available for use externally of the object. External access to private functions or data can be controlled by defining public functions for an object which can be invoked externally of the object. The public functions form a controlled and consistent interface between the private data and the outside world. Any attempt to write program code which directly accesses the private functions or data causes the compiler to generate an error message during compilation and stop the compilation process.

Polymorphism is a characteristic which allows multiple functions that have the same overall purpose, but that work with different data, to produce consistent results. Inheritance allows program developers to easily reuse preexisting functions and to reduce the need for creating redundant functions from scratch. The principles of inheritance allow a software developer to declare classes (and the objects which are later created from them) as related. Specifically, classes may be designated as derived classes of other base classes. A derived class inherits and has access to functions of its base classes just as if these functions appeared in the derived class. Alternatively, a derived class can override or modify an inherited function merely by defining a new function with the same name. Overriding or modifying does not alter the function in the base class, but merely modifies the use of the function in the derived class. The creation of a new derived class which has some of the functionality (with selective modification) of another class allows software developers to easily customize existing code to meet their particular needs.

One widely used and well known OOP language is C++. The C++ language is classified as a hybrid OOP language, as opposed to a pure or orthodox OOP language. Because the C++ language was designed as an improvement to and as an extension of C, it is full of the traditional features of ANSI C. C++ source code is usually compiled before being executed. Therefore, the C++ programming process entails a development cycle of editing, compiling, linking, and running. Although the iteration through the cycle is a slow process, the produced code is very fast and efficient. The C++ language provides an excellent balance between power of expression, run time speed, and memory requirements. C++ compilers are commercially available from several vendors.

Inheritance may provide the most power to the class concept in OOP. Inheritance allows classes to be continually built and extended with essentially no limit. C++ is different from some OOP languages because it allows multiple inheritance.

To illustrate the concept of virtual inheritance, reference will be made to the class inheritance trees in FIGS. 1A and 1B. In FIG. 1A, class D directly descends from both base classes B and C and indirectly descends from class A. In this example, class D might appear to a compiler to have two distinct A classes appearing as base classes. Having multiple copies of the same base class in an inheritance tree in the compiled program is confusing and wastes storage space. To solve this problem, a base class may be declared to be virtual so that the compiler is directed to share a single copy of a given base class object in the derived class objects. A class inheritance tree using class A as a virtual base class is illustrated in FIG. 1B. Virtual inheritance, i.e. inheritance from a virtual base class, is a primary strength for improving space and run time efficiency of the C++ object model. FIG. 1C shows the resulting complete class D 10 corresponding to the inheritance tree of FIG. 1A, in which the base class A is not virtual. FIG. 1D shows the resulting complete class D 15 corresponding to the inheritance tree of FIG. 1B, in which the base class A is virtual. As shown in FIG. 1D, virtual base classes are only shared within a complete object, in this case the complete object D 15. Also shown in FIG. 1D is the virtual function table 16 for object D 15, indicating a virtual function 17, for example, contained within the virtual base class A.

To use virtual inheritance in a C++ program, the programmer must specify one or more of a class's functions to be virtual. Typically, the complete set of virtual functions available is fixed at compile time and a programmer therefore cannot add or replace any function of the complete set at run time. Accordingly, fast dispatch of virtual function invocations is realized at the cost of run time flexibility. Virtual function calls are generally resolved by indexing into a table (conventionally known as a virtual function table)

constructed by the compiler, which holds the addresses of the virtual functions associated with the base class. A fundamental problem of virtual inheritance is to dispatch within the constraints of the C++ object model conventions, the virtual functions at run time with the correct object pointer for the object that is being processed.

More specifically, this problem relates to properly obtaining a pointer which points to a derived class when given a pointer to a virtual base class. In the C++ language such a pointer is referred to as a "this" pointer. The "this" pointer must point to a location in the base class object that contains the function. As a result, adjusting functions are used to obtain a new "this" pointer pointing to the derived class from a "this" pointer pointing to a virtual base class. However, it is difficult to correctly obtain the new "this" pointer because the virtual function may be shared by many interrelated classes having different class structures derived from the virtual base class.

A simple illustration for these terms is provided in FIG. 2A. Class A is the virtual base class for derived classes B, C, D, and E. Thereby, class D is a derived class of class B such that class A is a virtual base class to class B and class B is a virtual base class to class D. Also, class E is a derived class of class B, and also of class C. Because class A has been declared a virtual base class by the programmer, virtual function table pointers 210 are formed in class A which point to a virtual function table 220 associated therewith. The virtual function table 220 contains addresses corresponding to the functions 230 and 240 associated with class A. When the memory structure for the data structure of the virtual base class A is determined at compile time, memory space is set aside in class A for the virtual function table pointers 210, which will be initialized to point to the virtual function table 220, which in turn addresses the functions 230 and 240. The virtual function table 220 is used at run time to invoke the functions 230 and 240 associated with class A. As a result of virtual inheritance, the functions 230 and 240 may be shared by many different classes (in the present example these virtual function tables are shared by classes B, C, D, and E). However, in general, the virtual function table 220 and adjusting functions 250 and 260 may be different for each object of classes A, B, C, D or E.

At run time, when an object of class A has one of its functions called, and when that function is overridden within a derived class in the object, then a "this" pointer which is passed to that overriding function must be obtained from information available via the "this" pointer of the base class. For example, in FIG. 2A, if the function 230 is overridden in class B, then a call starting in class A must find a "this" pointer for class B (i.e., a "this" pointer 270) from information available via the "this" pointer 200.

In FIG. 2A, the adjusting functions 250 and 260 are shown which provide the adjustment of the "this" pointer 200. These adjusting functions 250 and 260 are small "assembly stubs" that obtain the correct "this" pointer 270 for the call to the function 230 or 240 by offsetting from the available "this" pointer 200, based on the actual layout of the complete object in memory. The adjusting functions 250 and 260 allow for the entries in the virtual function table 220 to remain simple pointers. The address contained within each entry of the virtual function table 220 directly addresses a function 230 or 240 when no adjustment is necessary; but the address addresses an associated adjusting function 250 or 260 when an adjustment of the "this" pointer 200 is necessary.

Such an implementation of adjusting functions solves the aforementioned offset problem if the adjusting functions are constructed at compile time but creates a compatibility problem. In FIG. 2A for example, there are two different offsets between base class objects B and A that are dependent upon the configuration of the complete class D or E in memory. Different offsets may be necessary for the same class, as shown for class B in this example. Therefore, the correct adjusting functions for intermediate classes (classes having at least one virtual base class and being derived by at least one other class, such as class B in the present example) cannot be uniquely determined for cases where entry into a function is effected at the intermediate class.

FIG. 2B shows example memory layouts for instantiations of the complete objects E and D as shown in FIG. 2A. A first memory layout 400 for object $E_1$ is shown having an offset 408 between class A and class B. A second memory layout E for object $E_2$ is shown having an offset 410 between class A and B, and a third memory layout for object $E_3$ 404 is shown having an offset 412 between class A and class B. A memory layout 406 for object D is shown having an offset 414 between class A and class B. Thus FIG. 2B shows several possible offsets between class A and class B.

In one presently used solution to this problem, the adjusting functions for all of the possible class instantiations are built at compile time. As the classes are analyzed at compile time, all of the possible class offsets are determined then stored in a table. This table is accessed at run time to obtain the offset information during construction of objects. However, an extra parameter (the extra parameter being a table which points to another table having the locations of the adjusting functions) must be included in the object model used by this solution. As a result, this solution is incompatible with existing object models because this extra parameter will not be recognized by the compilers which follow the design conventions as suggested in the C++ annotated reference manual. Also because the adjusting functions are stored in object files on the system's disk they must be brought off the disk and into memory, which is a relatively slow operation. Accordingly, this solution has the additional drawback of slowing down the speed of the compiled program at run time.

In another presently used solution, the adjusting functions are built at compile time by assuming that the class to be constructed is not a base class. Because it is not known how intermediate classes will be constructed at run time, an additional offset is provided for objects created from intermediate classes. Unfortunately, this offset does not work for all circumstances (e.g. cases having multiple interrelated base classes).

This problem of correctly calling virtual functions is recognized throughout the industry as an important problem to solve in facilitating the use of virtual inheritance in OOP languages as is readily seen by the large number of proposed attempts, which to date fail to completely solve this problem. In fact, a solution which provides the proper conversion for all class configurations including cases having multiple virtual base classes and virtual functions has yet to be implemented within the conventional object models. Therefore, a solution to this problem is desired that will always obtain a correct "this" pointer and is compatible with the existing object models.

SUMMARY OF THE INVENTION

It is therefore an object of the present invention to generate the correct "this" pointer to a derived object class when a virtual function is invoked on a base class object.

It is also another object of the present invention to generate a "this" pointer in a manner which is compatible with the existing object model used by a compiler.

In accordance with the invention, the virtual function tables and adjusting functions are generated for some base classes at run time, when the offsets from the base classes to their derived classes are known. In particular, an object data structure is provided by a language translator, such as a compiler, which determines the memory structure at compile time for a plurality of object classes including at least one base class and at least one class derived therefrom. At compile time, space for pointers (b-pointers) is set aside in each base class object that will have a base table (b-table) associated therewith. The b-pointers point at run time to their associated b-table, which must contain memory offsets between the base class objects within the derived class object. At runtime, constructors construct the class objects, starting from the most derived class objects and proceeding through to the inner base class object.

However, instead of generating the virtual function tables and associated pointers, as well as the adjusting functions, at compile time, the compiler generates the code that will do the generation at run time. Then at run time, a virtual function table is generated for the base class. Since the correct offsets are known from the contents of the tables at this time, all of the adjusting functions, the virtual function b-tables, and the virtual pointers may be generated correctly. Thus, the system completes the construction of an object.

The adjusting functions, virtual function table, and virtual pointers for the most derived class may, of course, be generated at compile time as before. However, if they are generated at run time, the compiler is able to operate at a faster speed than in the conventional techniques which build these functions, tables, and pointers at compile time. In other words, the time necessary to generate these functions, tables and pointers at run time is less than the time necessary to retrieve them from the system's disk if generated at compile time.

In addition, the generating process for the virtual function tables and the adjusting functions may share identical virtual function tables and adjusting functions to further reduce runtime overhead.

BRIEF DESCRIPTION OF THE DRAWINGS

The invention description below refers to the accompanying drawings, of which.

DETAILED DESCRIPTION OF THE INVENTION

Figure 1A:
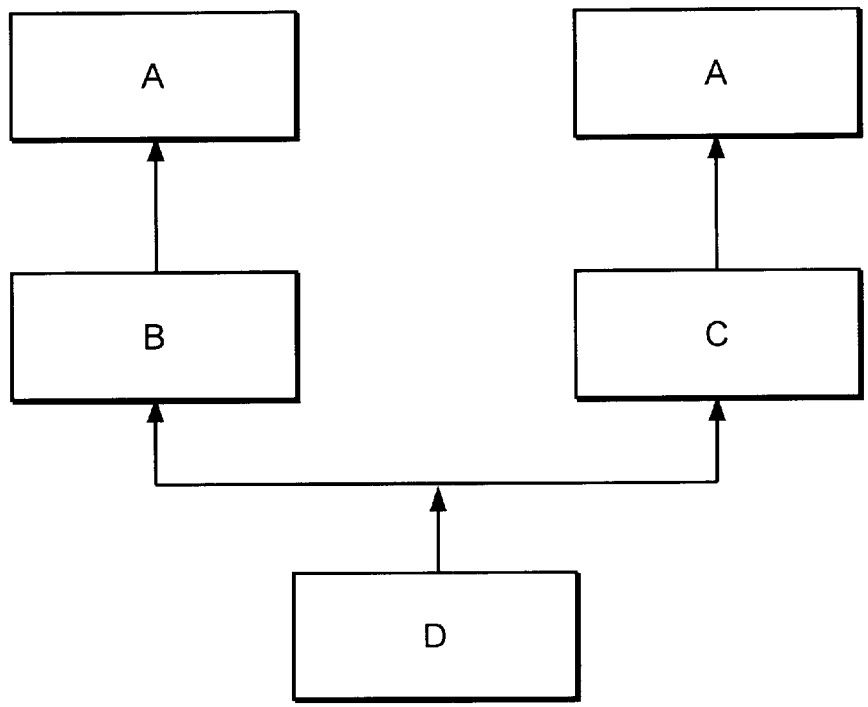
FIGS. 1A and 1B illustrate virtual class inheritance trees.
Figure 1B:
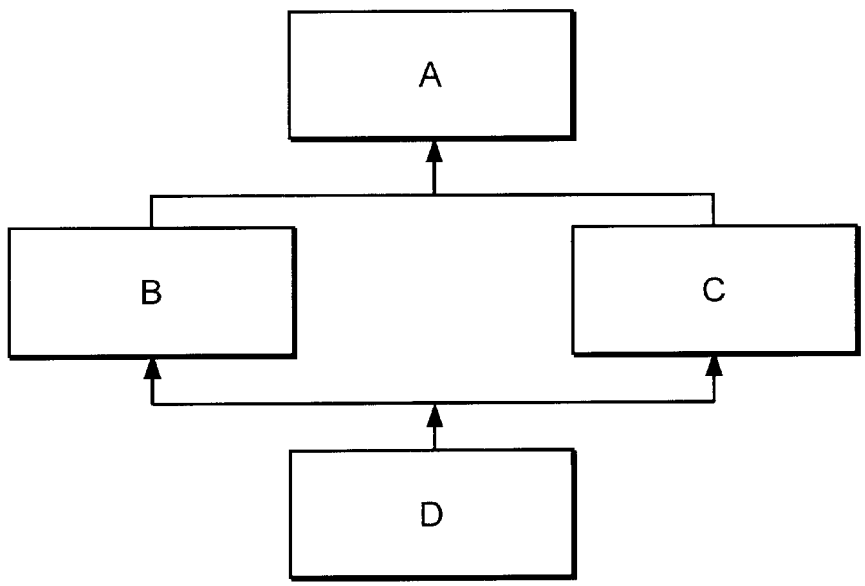
Figure 1C:
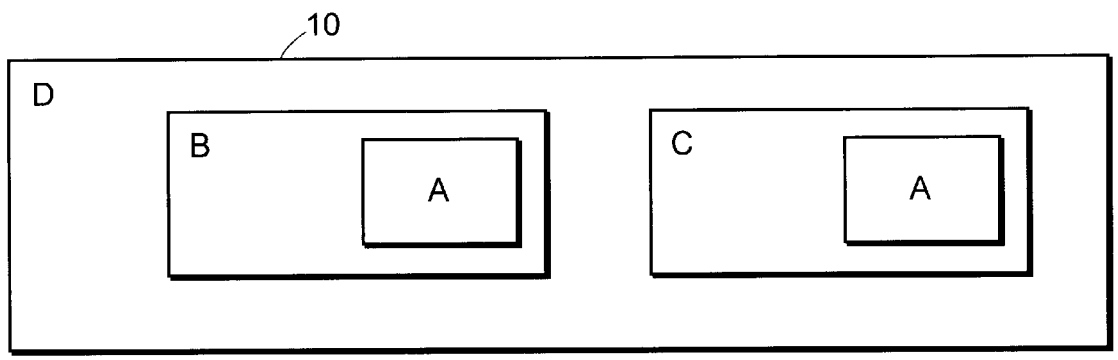
FIG. 1C and FIG. 1D show the resulting complete classes corresponding to FIG. 1A and FIG. 1B respectively.
Figure 1D:
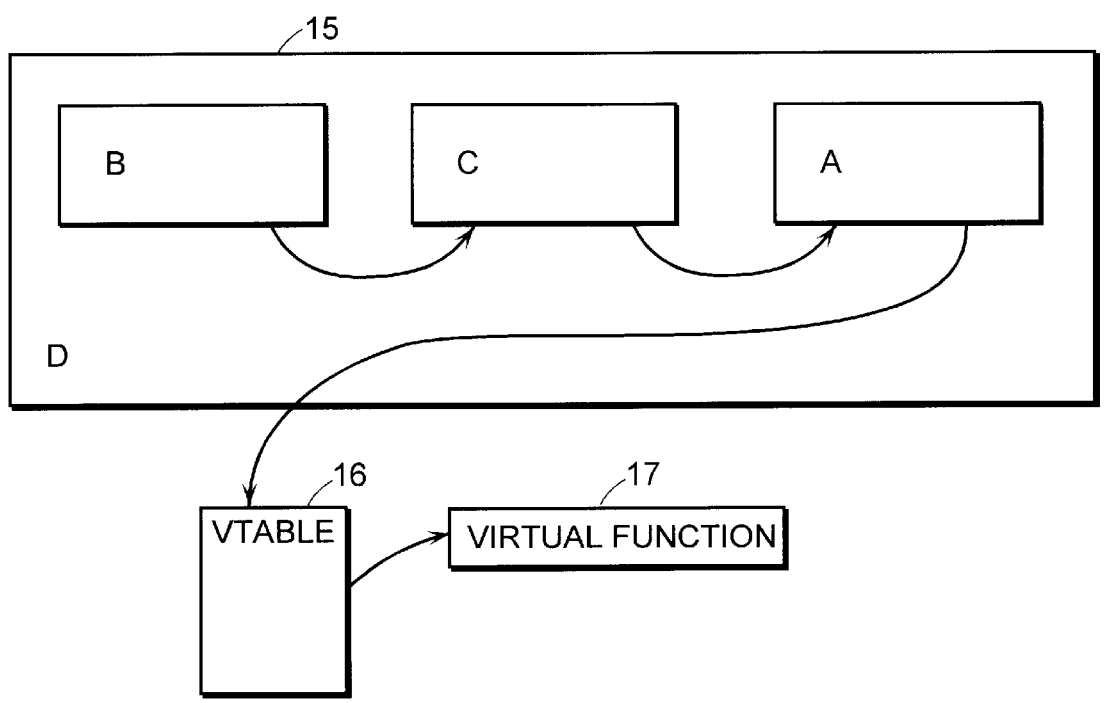
Figure 2A:
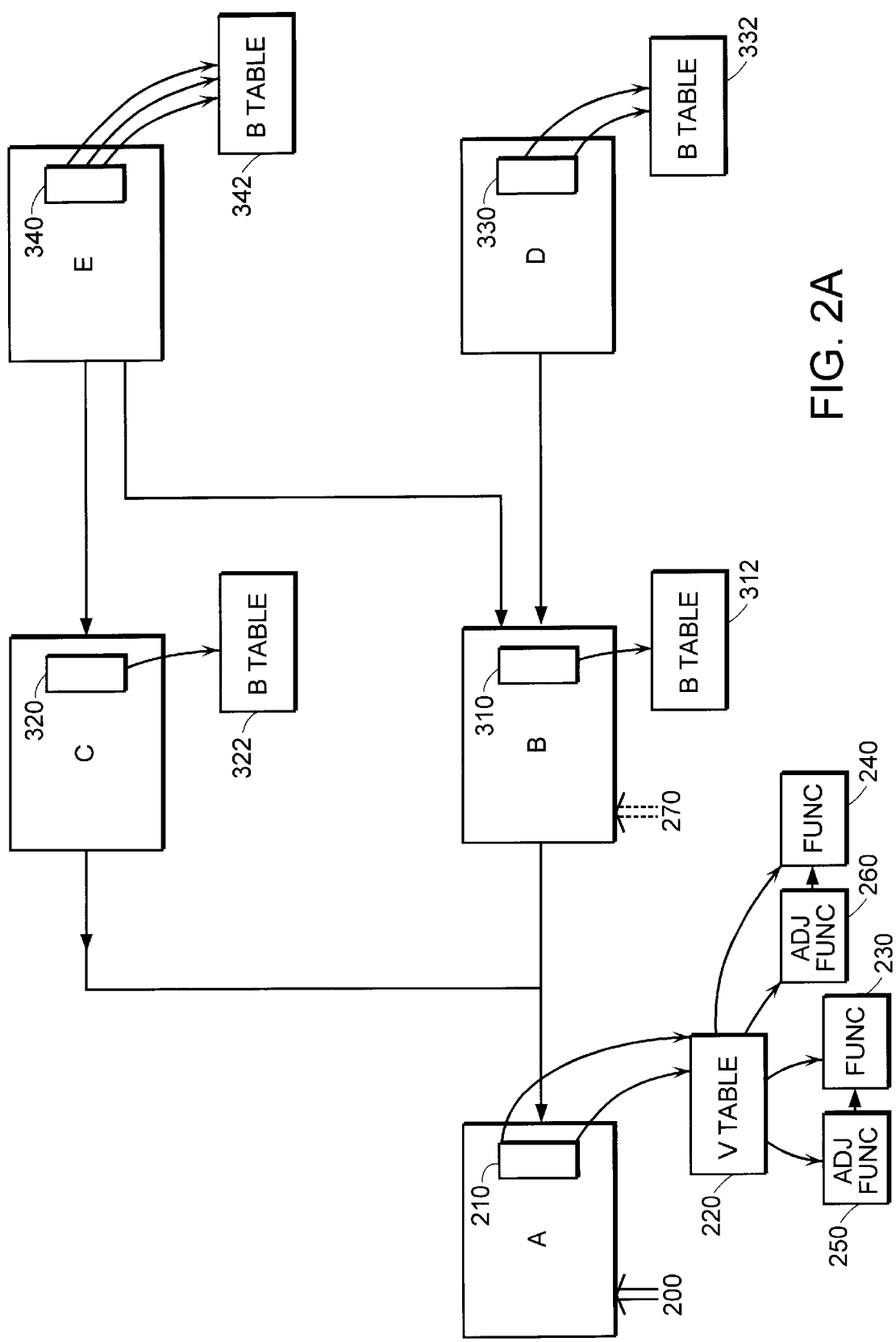
FIG. 2A is a block diagram of an object structure using OOP techniques.
Figure 2B:
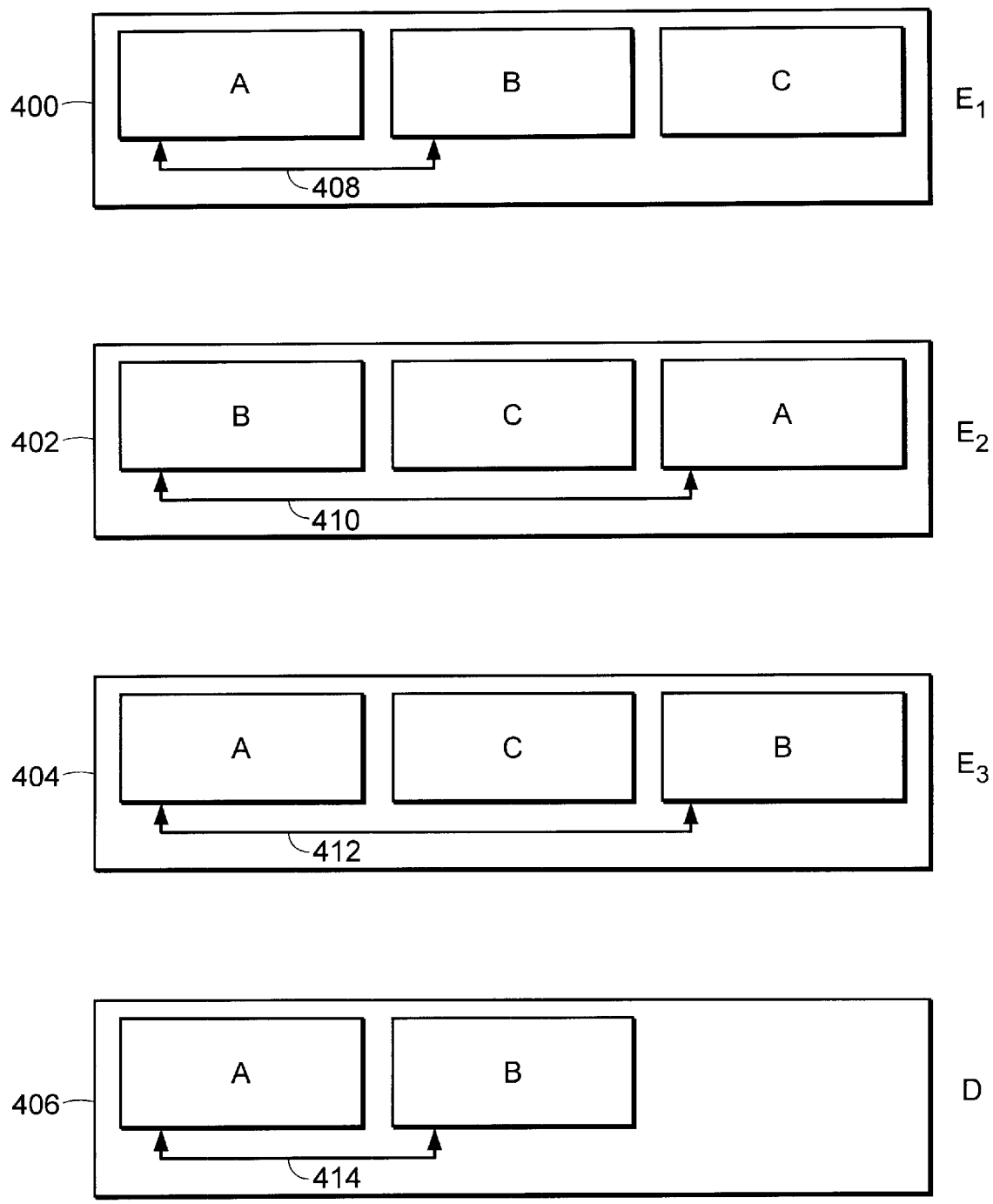
FIG. 2B shows example memory layouts for the complete objects E and D as shown in FIG. 2A.

A description of how b-tables are used will be provided with reference to FIG. 2A. Each of the derived classes B, C, D, and E include base table pointers (or b-pointers) 310, 320, 330, and 340 which point to their own b-tables 312, 322, 332, and 342 respectively. Class A will not have any b-pointers or a b-table because it is not derived from any other class. When the classes are compiled, each of the b-tables 312, 322, 332, and 342 is generated containing a base class offset from the corresponding derived class objects to each of its base class objects, and the b-pointers 310, 320, 330, and 340 are set aside in each of the derived classes to point to each of the b-tables 312, 322, 332, and 342. In this example, class B is a base class for both classes D and E. However, the objects of this class within objects of classes D and E will have different offsets from the virtual base class A. At the end of compile time, the b-table 332 for class D will include the class offsets for its base classes B and A and the b-table 312 for class B will include the class offsets for class A, its only base class. Similarly, the b-table 342 for class E will include the class offsets for its base classes B, C, and A, and the b-table 322 for class C will include the offset for class A.

The present invention utilizes the fact that this base class offset information is available at run time when an object is being constructed. Specifically, this base class offset information is obtainable to generate the adjusting functions without passing any new or extra parameters so that this solution is compatible with existing object models.

With reference to FIG. 2A, the correct base class offset from derived class B to base class A will vary because the base class offset may be affected by class C being put between classes A and B in a class E object but not in a class D object. For discussion purposes, it is assumed that the object is class B within the complete object of class D and has a base class offset entered in the b-table 312. At run time, when the constructor for the virtual base class A is called by the constructor for its derived class B during recursive construction, the base class offset between A and B is made available to base class object A by means of the adjusting functions 250 and 260. The virtual function pointers 210, the virtual function table 220 and the adjusting functions 250 and 260 may be generated at run time, because the correct base class offset is known to the constructor for class B because the base class offset is in the b-table 312 for base class B object.

When the function 230 is called for the object in the present example, the "this" pointer value pointer used will be the "this" pointer 200 pointed to the base class A object. The virtual function pointers 210 will point to the virtual function table 220 (which has just been generated during run time). This table will in turn contain a pointer to the adjusting function 250 (which has also been generated at run time). The adjusting function 250 will first take the "this" pointer pointing at location 200 and use it to obtain the "this" pointer pointing at the derived class B (corresponding to the location as shown by 270) and then call the adjusting function 230, resulting in the correct function being called with the correct "this" pointer.

Figure 3:
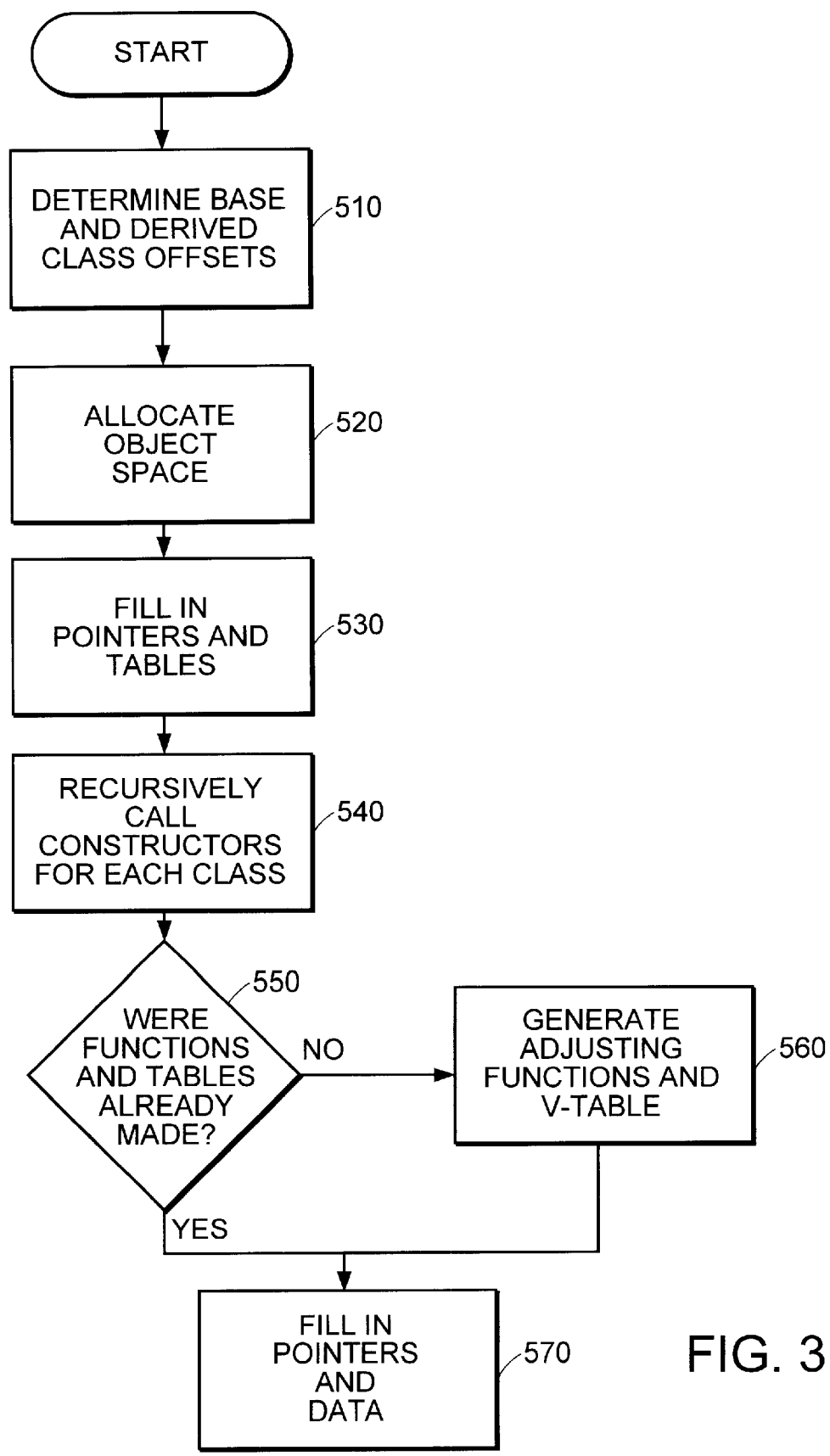
FIG. 3 is a flow chart of a method for generating an object according to an embodiment of the present invention.

An embodiment of the present invention will be described with reference to the flow chart of FIG. 3. In the first step 510, the compiler determines the offsets of data and pointers within classes, and the placement of base classes within complete classes. Also during step 510, the compiler generates the instructions and data for the computer to execute during the later steps. Included in these data and instructions are any virtual function tables, b-tables, and adjusting functions that the compiler determines are both possible and desirable to include.

Next at step 520, the space for an object is allocated during run time. At step 530, the b-pointers and the b-tables are filled with their base class offsets. At this point, the object is entirely laid out with the b-pointers and b-tables providing a foundation so that data may be accessed.

After the b-pointers of the object have been filled in, the constructors of each of the virtual base class objects are called at step 540.

The program then determines at step 550 whether the adjusting functions and the virtual function table for each of the virtual base classes are already available, having been made at step 510 or at an earlier invocation of step 560. If the adjusting functions and the virtual function table were not previously generated for a virtual base class, the constructor generates the adjusting functions and the virtual function table at step 560 by generating the appropriate instructions using information for the b-table and other sources. Then, the virtual function table pointer of the class object is pointed at the appropriate virtual function table at step 570.

In addition, according to another aspect of the present invention, resource sharing techniques can be used when generating the virtual function tables and the adjusting functions, so as to reduce the amount of memory space utilized. When generating a virtual function table or an adjusting function at run time, the program determines whether an adjusting function with the identical offset and function has already been generated or whether a virtual function table having the same addresses has already been generated. If an identical one has been generated before, it can be shared so that memory optimization is realized. If an identical one has not already been generated, then the new function or table is simply generated.

According to another aspect of the present invention, the adjusting functions and virtual function tables for some objects can be generated at compile time when the correct offsets are known. For example, classes D and E are the most derived classes in FIG. 2A and the adjusting functions for these can be generated at compile time. Then when a class object is constructed at run-time the remaining virtual function tables and adjusting functions can be generated. However, it may take more time to retrieve these functions and tables from storage at run time than to actually generate these functions and tables at run time. Sharing optimizations can again be realized for the compile-time generated adjusting functions and virtual function tables by using the same techniques as described above.

The foregoing description has been directed to specific embodiments of the invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for generating an object data structure, comprising the steps of:
   determining a base class offset between a virtual base class and a derived class, said derived class derived from said virtual base class;
   generating a base table for said derived class, said base table including said base class offset;
   using a compiler to generate computer program code for being executed at run time to create at run time a virtual function table for said base class and all adjusting functions for said virtual base class, the virtual function table containing pointers to said adjusting functions; and
   at run time, executing said program code to create said virtual function table and said adjusting functions, said adjusting functions being operable to generate other pointer to the derived class based upon contents of said base table, when executed.

2. A method according to claim 1, further comprising the steps of:
   generating virtual function tables amd adjusting functions for a derived class at compile time; and
   generating virtual tables and adjusting functions for the remaining classes at run time.

3. A language translator comprising:
   a base class offset determiner, operable to determine a base class offset between a virtual base class and a derived class, said derived class being derived from said virtual base class;
   a base table generator, operable to generate a base table for said derived class, said base table including said base class offset; and
   a program code generator for generating computer program code for being executed at run time to create at run time a virtual function table and an adjusting function for said virtual base class, the virtual function table containing a pointer to said adjusting function,
   said adjusting function being operable to generate another pointer, based upon contents of the base table, to the derived object when executed.

4. A language translator according to claim 3, further comprising:
   a virtual table generator operable to generate virtual tables and adjusting functions for the most derived class at compile time; and wherein
   the program code generator generates program code for being executed at run time to generate the virtual tables and adjusting functions for the remaining classes at run time.

5. A computer program product including a computer readable medium having executable instructions representing a computer program recorded thereon, said executable instructions comprising:
   program code for determining a base class offset between a virtual base class and a derived class, said derived class being derived from said virtual base class;
   program code for generating a base table for said derived class, said base table including said base class offset; and
   program code for generating other program code for being executed at run time to create at run time a virtual function table and an adjusting function for said virtual base class, said adjusting function being operable to generate a pointer, based upon contents of the base table, to the derived class object when executed, the virtual function table containing another pointer to the adjusting function.

6. A computer program product according to claim 4, said executable instructions further comprising:
   program code for generating virtual tables and adjusting functions for the most derived class at compile time; and wherein
   the other program code is also for generating virtual tables and adjusting functions for the remaining classes at run time.

7. A method according to claim 1, further comprising, prior to generating said adjusting function, determining whether another adjusting function already has been generated which is operable to generate an identical pointer to the derived class object.

8. A language translator according to claim 3, wherein said program code is also for determining, when executed at run time, whether another adjusting function has been created that is operable to generate an identical pointer to the derived object class.

9. A computer program product according to claim 4, wherein the other program code is also for determining, when executed at run time, whether another adjusting function has been created that is operable to generate an identical pointer to the derived object class.

* * * * *